(12) United States Patent
Fu et al.

(10) Patent No.: US 8,768,634 B2
(45) Date of Patent: Jul. 1, 2014

(54) DIAGNOSIS METHOD OF DEFECTS IN A MOTOR AND DIAGNOSIS DEVICE THEREOF

(75) Inventors: Chia-Lin Fu, Zhongli (TW); Chen-Kai Hsu, Miaoli (TW); Ming-Hsiu Hsu, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 533 days.

(21) Appl. No.: 12/420,094

(22) Filed: Apr. 8, 2009

(65) Prior Publication Data

US 2010/0145639 A1 Jun. 10, 2010

(30) Foreign Application Priority Data

Dec. 10, 2008 (TW) ................................ 97148094 A

(51) Int. Cl.
*G01N 29/00* (2006.01)
*G06F 19/00* (2011.01)

(52) U.S. Cl.
USPC ............................................. 702/56; 702/183

(58) Field of Classification Search
USPC .................. 702/56, 183, 34, 35, 181, 182
See application file for complete search history.

(56) References Cited

U.S. PATENT DOCUMENTS

| | | | | |
|---|---|---|---|---|
| 4,435,770 A | * | 3/1984 | Shiohata et al. | 702/56 |
| 4,751,657 A | * | 6/1988 | Imam et al. | 702/35 |
| 5,049,815 A | | 9/1991 | Kliman | |
| 6,014,598 A | | 1/2000 | Duyar et al. | |
| 6,215,408 B1 | * | 4/2001 | Leonard et al. | 340/644 |
| 6,308,140 B1 | | 10/2001 | Dowling et al. | |
| 6,456,946 B1 | | 9/2002 | O'Gorman | |
| 6,590,362 B2 | | 7/2003 | Parlos et al. | |
| 6,597,048 B1 | * | 7/2003 | Kan | 257/415 |
| 7,233,886 B2 | | 6/2007 | Wegerich et al. | |
| 7,298,282 B2 | | 11/2007 | Gustafson et al. | |
| 7,308,322 B1 | | 12/2007 | Discenzo et al. | |

(Continued)

FOREIGN PATENT DOCUMENTS

| | | |
|---|---|---|
| TW | 286359 | 9/1996 |
| TW | 327221 | 2/1998 |

OTHER PUBLICATIONS

P. Gupta et al. "Comparative Vibration and Noise Signature Analysis by Spectral, Cepstral and Wavelet Techniques", Advances in Vibration Engineering, 7(2) 2008, pp. 181-195, www.bvucoepune.edu.in/pdf's/Publications...08/.../NC11_2008-09.pdf.*

(Continued)

*Primary Examiner* — Michael Nghiem
*Assistant Examiner* — Alexander Satanovsky
(74) *Attorney, Agent, or Firm* — Stevens & Showalter, LLP

(57) ABSTRACT

A diagnosis method of defects in a motor and a diagnosis device thereof are described. A vibration sensing module can generate a vibration signal corresponding to a vibration of a motor during operation of the motor. Then, a data pre-processing procedure is performed to eliminate noises of the vibration signal. After the data pre-processing procedure, an analyzing procedure is performed to determine a first harmonic of spectrum features in the spectrum of the pre-processed vibration signal. And, other spectrum feature(s) is(/are) retrieved from the spectrum of the pre-processed vibration signal according to the first harmonic. Finally, a comparison procedure is performed with a defect spectrum feature database according to the retrieved spectrum features, so as to determine a defect type of the motor.

15 Claims, 6 Drawing Sheets

(56) References Cited

U.S. PATENT DOCUMENTS

| | | | |
|---|---|---|---|
| 7,860,663 B2* | 12/2010 | Miyasaka et al. | 702/35 |
| 2003/0028332 A1* | 2/2003 | DiMaggio et al. | 702/35 |
| 2008/0234964 A1 | 9/2008 | Miyasaka et al. | |

OTHER PUBLICATIONS

Stephen A. Seeber, "Ultrasound Testing Enhances Vibration Analysis", Mid Atlantic Infrared Services, Inc., Bethesda, MD 20816, Published in P/PM Technology, Oct. 1995, 6 pages, www.midatlanticinfrared.com/publications/pub4.pdf.*

Naim Baydar et al., A Comparative Study of Acoustic and Vibration Signals in Detection of Gear Failures Using Wigner-Ville Distribution, Mechanical Systems and Signal Processing (2001) 15(6), pp. 1091-1107, linkinghub.elsevier.com/retrieve/pii/S0888327000913384.*

Li W et al., "Induction Motor Fault Detection Using Hybrid Methods", WCEAM 2006 Paper 045, p. 1-12, www.springerlink.com/index/k18r228g278h5n58.pdf.*

Mirko Cudina et al., "Noise Generation by Vacuum Cleaner Suction Units. Part III. Contribution of Structure-Borne Noise to Total Sound Pressure Level", Applied Acoustics 68 (2007), pp. 521-537, linkinghub.elsevier.com/retrieve/pii/S0003682X06002052.*

Robert M. Jones "Enveloping for Bearing Analysis", Sound and Vibration/Feb. 1996, pp. 10-15.*

Foreign Office Action for application No. 097148094; dated Sep. 4, 2012; TIPO.

* cited by examiner

DIAGNOSIS METHOD OF DEFECTS IN A MOTOR AND DIAGNOSIS DEVICE THEREOF

CROSS-REFERENCE TO RELATED APPLICATIONS

This non-provisional application claims priority under 35 U.S.C. §119(a) on Patent Application No(s). 097148094 filed in Taiwan, R.O.C. on Dec. 10, 2008 the entire contents of which are hereby incorporated by reference.

BACKGROUND OF THE INVENTION

1. Field of the Invention

The present invention relates to a diagnosis method of defects and a diagnosis device thereof, in particular to a diagnosis method of defects in a motor and a diagnosis device thereof.

2. Related Art

The motor has been widely applied in each procedure from maintaining the manufacture to providing a source of a power system. If the motor fails due to certain defects, the manufacture may be interrupted. Thus, it is quite important to monitor and manage an operating status of the motor at any time. In conventional, the task of the diagnosis of the defects in the motor is carried out by experienced professional personnel. These professional personnel are experienced in the diagnosis of the defects in the motor and are quite understand the motor equipment, so that they can determine the operating status and defect type of the motor by means of measuring the vibration of the motor or recognizing the abnormal sounds during the operation of the motor. However, the number of such professional personnel is limited, and thus the research in the diagnosis for the motor is developed toward establishing an expert system.

The expert system includes the abundant experience of the professional personnel. When performing periodical inspections, the plant working personnel inspect and record the operating status information about the motor, and then input the information to a computer. Based on the input information, the expert system can determine the current operating status of the motor. When the operating status is serious or is uncertain such as to be not managed, the professional maintenance personnel will be requested to maintain this motor. In addition, diagnosis tools developed for the professional personnel having the backgrounds of analysis and diagnosis of vibration have been proposed, but the tools are rather expensive. Due to the highly professional demands for the related backgrounds of the analysis and diagnosis in the motor, the diagnosis tools are quite complicated in operation, and cannot be operated by common plant working personnel in the factory.

Generally, in the industry, the task of inspecting the motor is entrusted to consultant firms due to the requirements for the tools and professional knowledge, such that merely special and important motor equipment is diagnosed, and the other motor equipment is replaced only when certain practical defect occurs.

The current diagnosis method for the motor is implemented by taking an operation frequency, that is, a rotation speed of the motor as the basis. Therefore, most of the diagnosis tools require inputting the rotation speed data, or require a tachometer additionally, so as to obtain the rotation speed data. Thus, the diagnosis tools still need to be improved in terms of the operation and cost.

SUMMARY OF THE INVENTION

Accordingly, the present invention is directed to a diagnosis method of defects in a motor and a diagnosis device thereof, which are capable of automatically executing the diagnosis of the defects in the motor in real time simply with a vibration sensing signal and a sound signal, thereby improving an operation convenience of a motor diagnosis tool.

Therefore, the present invention provides a diagnosis method of defects in a motor, which includes: generating a vibration signal corresponding to a vibration of a motor by a vibration sensing module during operation of the motor; pre-processing the vibration signal to eliminate noises of the vibration signal; analyzing a spectrum of the vibration signal pre-processed to retrieve a first harmonic of a plurality of spectrum features in the spectrum of the vibration signal; retrieving at least one of the other of the spectrum features in the spectrum of the vibration signal according to the first harmonic; and searching a defect spectrum feature database with the retrieved spectrum features to determine a defect type of the motor.

In addition, the present invention provides a diagnosis device of defects in a motor, which includes: a vibration sensing module, for generating a vibration signal corresponding to a vibration of a motor during operation of the motor; a defect spectrum feature database, for storing a plurality of data of the defects to the spectrum features; a signal processing module, for receiving the vibration signal, analyzing a spectrum of the vibration signal to retrieve a first harmonic of a plurality of spectrum features in the spectrum of the vibration signal, retrieving at least one of the other of the spectrum features in the spectrum of the vibration signal according to the first harmonic, and looking up the defect spectrum feature database with the retrieved spectrum features to determine a defect type of the motor; a display module, for displaying data output from the signal processing module; and a communication interface module, for transmitting the data output from the signal processing module.

Through the diagnosis method of defects in a motor and the diagnosis device thereof according to the present invention, the diagnosis can be implemented merely with the vibration sensing information and the sound sensing information without other motor parameters. Furthermore, through the diagnosis method of defects in a motor and the diagnosis device thereof according to the present invention, even the vibration sensing information retrieved by the vibration sensing module, such as an accelerometer, can be used as only diagnosis data. Besides, the diagnosis method of defects in a motor and the diagnosis device thereof according to the present invention can be implemented by an embedded system with an advanced RISC machine (ARM) architecture, and the embedded system with an advanced RISC machine (ARM) architecture is used together to perform classification algorithm and comparison, so as to determine the defect type of the motor. Especially, when performing a routing inspection, the plant working personnel can primarily diagnose each motor immediately through such system. Once an abnormal circumstance is primarily diagnosed, the consultant firms perform a detailed estimation on the performance of the motor by using professional tools and techniques. Thus, according to the present invention, the diagnosis method of the defects in the motor and the diagnosis device thereof have advantages of, for example, a high diagnosis speed, a low cost, and being easily operated.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
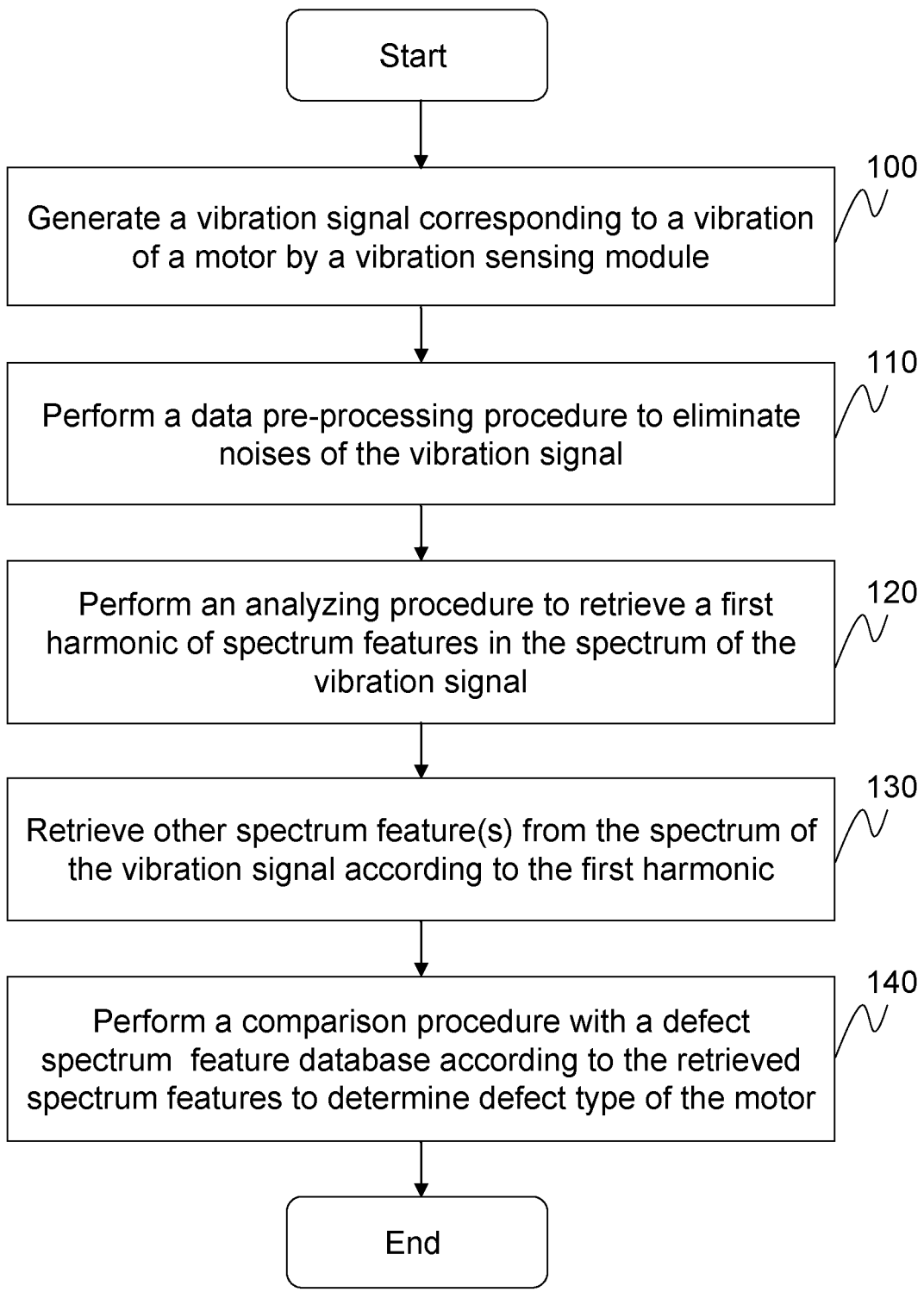
FIG. 1 is a flow chart of a diagnosis method according to a first embodiment of the present invention.

FIG. 1 is a flow chart of a diagnosis method according to a first embodiment of the present invention. Referring to FIG. 1, the diagnosis method of the defects in the motor equipment of the present invention includes the following steps.

Firstly, a vibration sensing module is provided to generate a vibration signal corresponding to a vibration of a motor during operation of the motor (Step 100). The vibration sensing module may be, for example, an accelerometer, so as to obtain an acceleration data of the vibration signal.

Next, a data pre-processing procedure is performed to pre-process the vibration signal, so as to eliminate noises of the vibration signal (Step 110). The data pre-processing procedure includes an integral procedure. The vibration signal obtained by the vibration sensing module is the acceleration data, and the acceleration data includes noises. Thus, after performing the integral procedure to integrate the acceleration data, the noises in the vibration signal are relatively reduced.

Then, an analyzing procedure is performed to analyze a spectrum of the pre-processed vibration signal after the data pre-processing procedure, so as to retrieve a first harmonic of spectrum features in the spectrum of the vibration signal, i.e. identify a position of fundamental frequency in the spectrum of the vibration signal (Step 120). The vibration signal is domain-transformed (for example, through a fast Fourier transform) into a signal in a speed frequency domain (that is, a speed spectrum) and a signal in an acceleration frequency domain (that is, an acceleration spectrum). In other words, the spectrum of the vibration signal can include the speed spectrum and the acceleration spectrum. In the analyzing procedure, maximum values in the speed spectrum and the acceleration spectrum are obtained. And, a normalization process is performed to normalize all spectrum values in the spectrums. The data normalization process includes dividing all the spectrum values in the speed spectrum by the maximum value in the speed spectrum, and dividing all the spectrum values in the acceleration spectrum by the maximum value in the acceleration spectrum.

Then, according to the maximum values in the speed spectrum and the acceleration spectrum, the spectrum values in the spectrum are sequentially sorted and determined. If two positions where the acceleration spectrum has the maximum value and the speed spectrum has the maximum value correspond to each other, the position is the position of the first harmonic in the spectrum of the vibration signal, i.e. the frequency in the spectrum appearing the first harmonic. Alternatively, the position of the maximum value in the speed spectrum can be identified as the position of the fundamental frequency. The fundamental frequency is the first harmonic.

Then, other spectrum feature(s) is(are) retrieved from the spectrum of the vibration signal according to the first harmonic (Step 130). The other spectrum feature(s) may be derived from the spectrum of the vibration signal based on the position of the fundamental frequency. That is, the spectrum of the vibration signal has multiple frequencies. The first harmonic of the spectrum features in the spectrum can be analyzed and retrieved from the multiple frequencies, and then the other of the spectrum features in the spectrum can be inferred from the multiple frequencies with the first harmonic. The spectrum feature may be, for example, 0.5× frequency multiplication, 1× frequency multiplication (first harmonic), 1.5× frequency multiplication, 2× frequency multiplication (second harmonic), 2.5× frequency multiplication, or 3× frequency multiplication (third harmonic) to 10× frequency multiplication (tenth harmonic). Alternatively, the spectrum feature may be, ±1.5% multiple harmonic frequency of the first harmonic in the spectrum of the vibration signal.

Then, a comparison procedure is performed with a defect spectrum feature database according to the retrieved spectrum features, so as to differentiate a defect type of the motor (Step 140). In the comparison procedure, the data in the defect spectrum feature database are search and compared with the retrieved spectrum features, to search and find out defect type of the motor from the defect spectrum feature database.

The defect spectrum feature database stores a plurality of data of the defects to the spectrum features. The data of the defects to the spectrum features includes the spectrum features of each defect type, and may be, for example, presented in Table 1 as follows.

TABLE 1

| Defect type | Frequency Multiplication | | | | | | |
|---|---|---|---|---|---|---|---|
| | 0.5× | 1× | 1.5× | 2× | 2.5× | 3× | 4× |
| Unbalance | 0 | 1 | 0 | 0.1 | 0 | 0 | 0 |
| Shaft Bending | 0 | 1 | 0 | 0.6 | 0 | 0.2 | 0 |
| Misalignment | 0 | 0.8 | 0 | 1 | 0 | 0.8 | 0.2 |
| Looseness | 0.4 | 1 | 0.2 | 0.2 | 0.1 | 0.1 | 0.1 |

Figure 2:
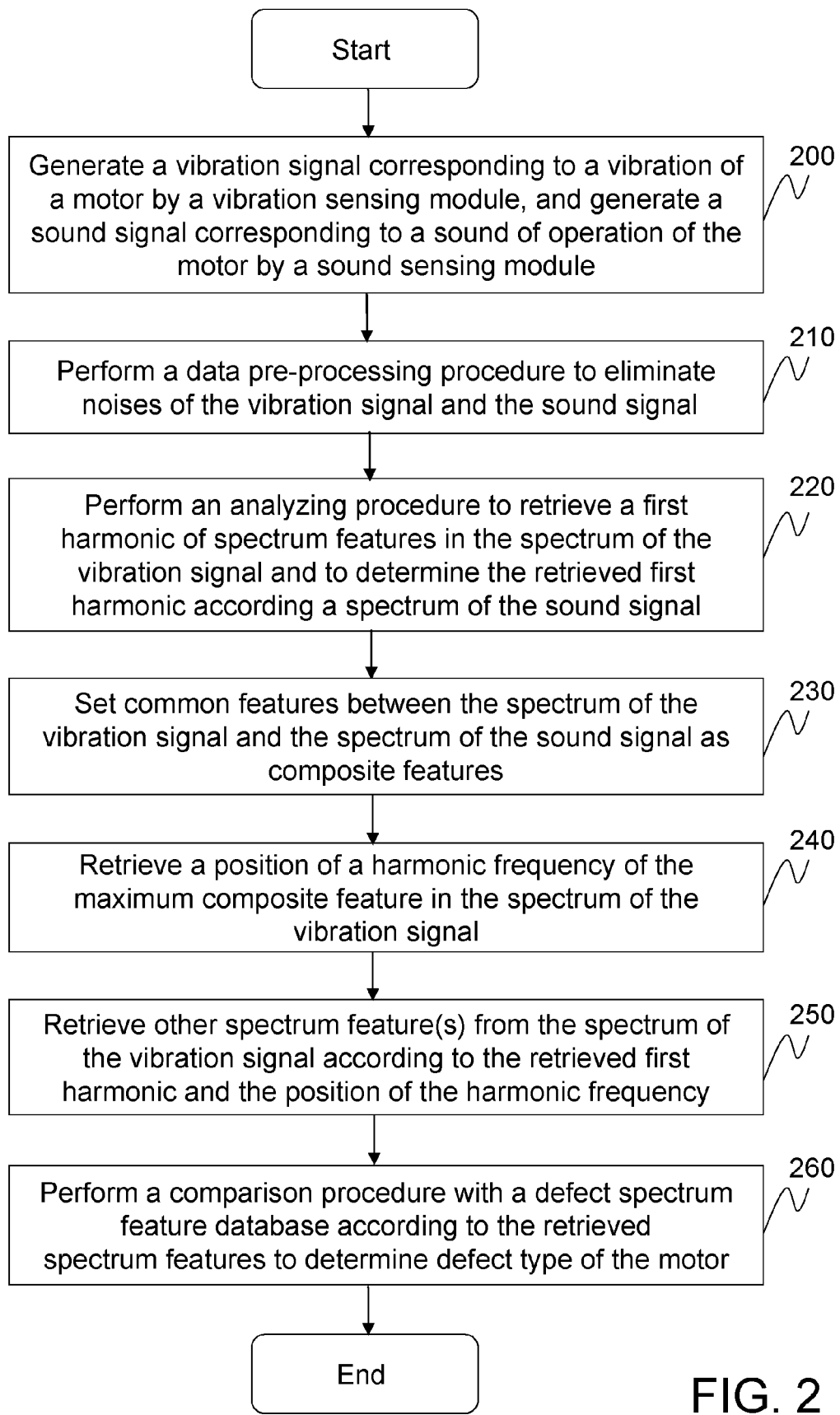
FIG. 2 is a flow chart of the diagnosis method according to a second embodiment of the present invention.

FIG. 2 is a flow chart of a diagnosis method according to a second embodiment of the present invention. Referring to FIG. 2, the diagnosis method of defects in a motor according to the present invention can be used to diagnose a defect type of a bearing, which includes the following steps.

Firstly, a vibration sensing module and a sound sensing module are provided to respectively generate a vibration signal corresponding to a vibration of a motor and a sound signal corresponding to a sound of operation of the motor during the operation of the motor (Step 200). The vibration sensing module may be, for example, an accelerometer for obtaining an acceleration data of the vibration signal. The sound sensing module may be, for example, a microphone. The defect types for a ball bearing may be approximately classified into damages to an inner ring, damages to an outer ring, and ball damages. When the defect occurs to the ball bearing, different abnormal sounds and vibrations are generated, such that the defect can be detected by using the vibration sensing module and the sound sensing module respectively.

Next, a data pre-processing procedure is performed to pre-process the vibration signal and the sound signal, so as to respectively eliminate noises of the vibration signal and the sound signal (Step 210). The data pre-processing procedure includes an integral procedure. The vibration signal obtained by the vibration sensing module is the acceleration data, and the acceleration data includes noises. Thus, after performing the integral procedure to integrate the acceleration data, the noises in the vibration signal are relatively reduced. Similarly, the noises of the sound signal are eliminated through the integral procedure.

Then, an analyzing procedure is performed to analyze a spectrum of the pre-processed vibration signal after the data pre-processing procedure, so as to retrieve a first harmonic of spectrum features in the spectrum of the vibration signal, i.e. identify a position of the first harmonic in the spectrum of the vibration signal, and then to determine the first harmonic according a spectrum of the sound signal (Step 220).

Particularly, the vibration signal is domain-transformed (for example, through a fast Fourier transform) into a signal in a speed frequency domain (that is, a speed spectrum) and a signal in an acceleration frequency domain (that is, an acceleration spectrum). The spectrum of the vibration signal includes the speed spectrum and the acceleration spectrum. In the analyzing procedure, maximum values in the speed spectrum and the acceleration spectrum are respectively obtained. And, a normalization process is performed to normalize all spectrum values in the spectrums. The normalization process includes dividing all the spectrum values in the speed spectrum by the maximum value in the speed spectrum, and dividing all the spectrum values in the acceleration spectrum by the maximum value in the acceleration spectrum.

Subsequently, according to the maximum values in the speed spectrum and the acceleration spectrum, the spectrum values in the spectrums are sequentially sorted and determined. If the acceleration spectrum has the maximum value in a position corresponding to one of the maximum value in the speed spectrum, the position is the position of the fundamental frequency in the spectrum of the vibration signal, i.e. the fundamental frequency in the spectrum is the first harmonic. Alternatively, the position of the maximum value in the speed spectrum can be identified as the position of the fundamental frequency.

The sound signal is domain-transformed (for example, through the fast Fourier transform) to generate a signal in a sound frequency domain (that is, a sound spectrum), so as to further determine whether the retrieved first harmonic of the spectrum of the vibration signal is correct or not according to the spectrum of the sound signal.

Then, the common features between the spectrum of the vibration signal and the spectrum of the sound signal are set as composite features (Step 230). If both the spectrum of the vibration signal and the spectrum of the sound signal have or do not have peak values under the same frequency, the composite feature is set to 1. If one of the spectrums of the vibration signal and the sound signal has a peak value and the other does not have a peak value under the same frequency, the composite feature is set to 0.

Then, a position of a harmonic frequency of the maximum composite feature of the composite features in the spectrum of the vibration signal is retrieved (Step 240). The position of the harmonic frequency may be, for example, a position of a third harmonic.

Then, other spectrum feature(s) is(/are) retrieved from the spectrum of the vibration signal according to the first harmonic and the position of the harmonic frequency (Step 250). Each of the other of the spectrum features may be derived according to the first harmonic. That is, the spectrum of the vibration signal has multiple frequencies. The first harmonic of the spectrum features in the spectrum can be analyzed and retrieved from the multiple frequencies, and then the other of the spectrum features in the spectrum can be inferred from the multiple frequencies with the first harmonic. The spectrum feature may be, for example, 0.5× frequency multiplication, 1× frequency multiplication (first harmonic), 1.5× frequency multiplication, 2× frequency multiplication (second harmonic), 2.5× frequency multiplication, or 3× frequency multiplication (third harmonic) to 10× frequency multiplication (tenth harmonic). Alternatively, the spectrum feature may be, ±1.5% multiple harmonic frequency of the first harmonic in the spectrum of the vibration signal.

Then, a comparison procedure is performed with a defect spectrum feature database according to the retrieved spectrum features, so as to differentiate a defect type of the motor (Step 260). In the comparison procedure, the data in the defect spectrum feature database are search and compared with the retrieved spectrum features, to search and find out defect type of the motor from the defect spectrum feature database.

The defect spectrum feature database stores a plurality of data of the defects to the spectrum features. The data of the defects to the spectrum features includes the spectrum feature(s) of each defect type, and may be, for example, presented in Table 1.

In addition, in the first and second embodiments of the present invention, through a frequency spectrum analyzer or the fast Flourier transform, the vibration signal is transformed from a time domain to a frequency spectrum, and the vibration signal is decomposed to integral or fractional multiple frequency multiplication of the rotation speed frequency, some specific feature dither frequencies, frequency clusters, and inherit dither frequencies, etc. An amplitude peak value corresponding to each frequency represents a magnitude of an energy of a vibration dither, such that the possible defect types may be determined according to the distribution of the frequency peak values generated by the vibration dither. The usual defect types of the motor can include unbalance of a rotor, misalignment of the rotor, looseness of the rotor, shaft bending of the rotor, bearing of a ball and combination of at least two of the unbalance, the misalignment, the looseness, the shaft bending and the bearing.

Figure 3A:
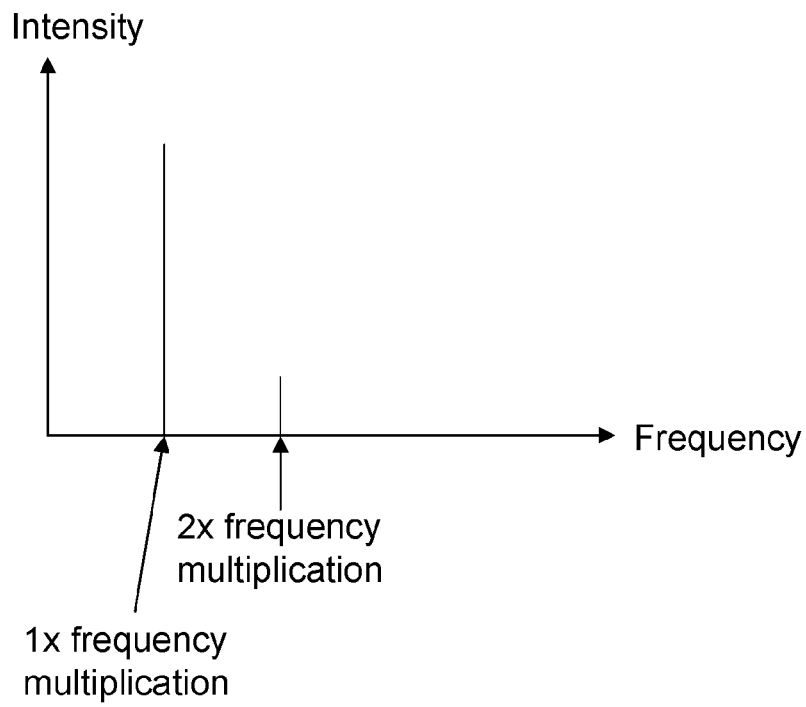
FIG. 3A is a schematic view of a spectrum of the vibration signal under rotor unbalance of the motor according to the present invention.

FIG. 3A is a schematic view of a spectrum of the vibration signal under the rotor unbalance of the motor according to the present invention. Referring to FIG. 3A, when the rotor unbalance occurs, the spectrum features show that an amplitude value of 1 multiple frequency multiplication is larger, and the harmonic frequency is smaller.

Figure 3B:
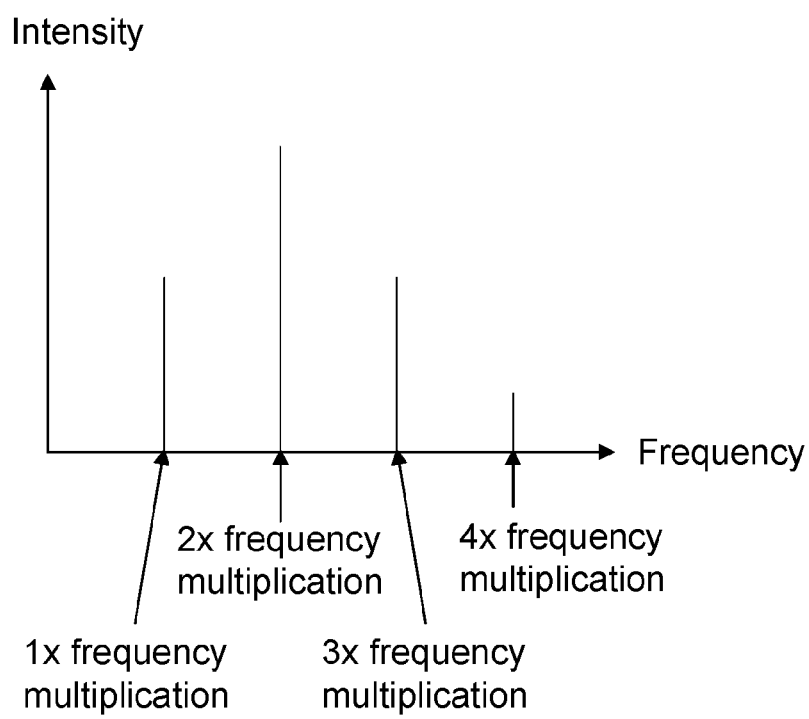
FIG. 3B is a schematic view of the spectrum of the vibration signal under rotor misalignment of the motor according to the present invention.

FIG. 3B is a schematic view of the spectrum of the vibration signal under the rotor misalignment according to the present invention. Referring to FIG. 3B, when the rotor misalignment occurs, the spectrum features show that an amplitude value of the double frequency multiplication is larger, followed by the 1 multiple frequency multiplication and the triple frequency multiplication.

Figure 3C:
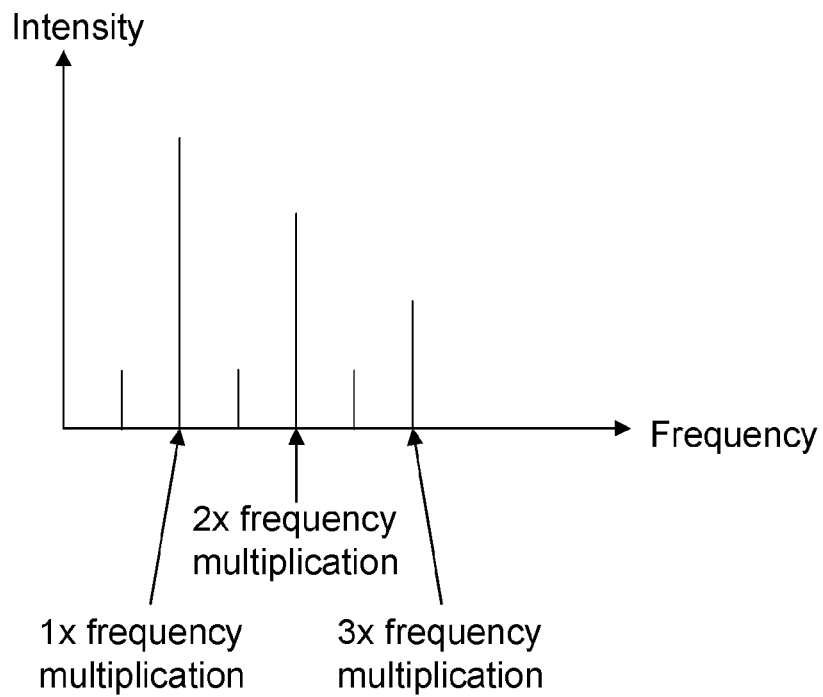
FIG. 3C is a schematic view of the spectrum of the vibration signal under rotor looseness of the motor according to the present invention.

FIG. 3C is a schematic view of the spectrum of the vibration signal under the rotor looseness according to the present invention. Referring to FIG. 3C, when the rotor looseness occurs, the spectrum features show that the rotation speed frequency and the harmonic frequency tend to be greatly increased.

Figure 3D:
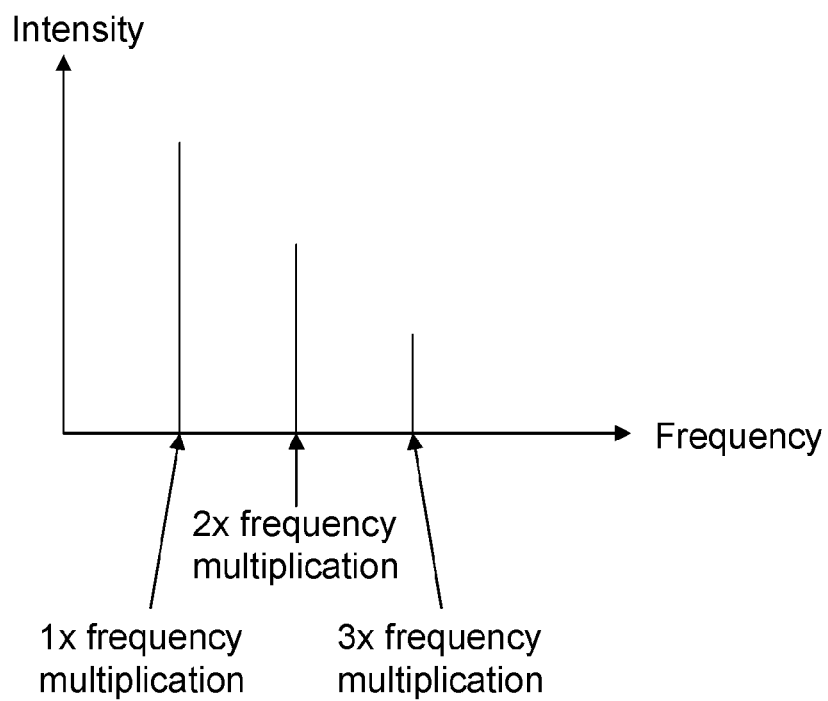
FIG. 3D is a schematic view of the spectrum of the vibration signal under f rotor shaft bending of the motor according to the present invention.

FIG. 3D is a schematic view of the spectrum of the vibration signal under the rotor shaft bending according to the present invention. Referring to FIG. 3D, when the rotor shaft bending occurs, the spectrum features show that an amplitude value of the 1 multiple frequency multiplication is larger, followed by the double frequency multiplication and the triple frequency multiplication that also have large amplitude values.

Figure 4:
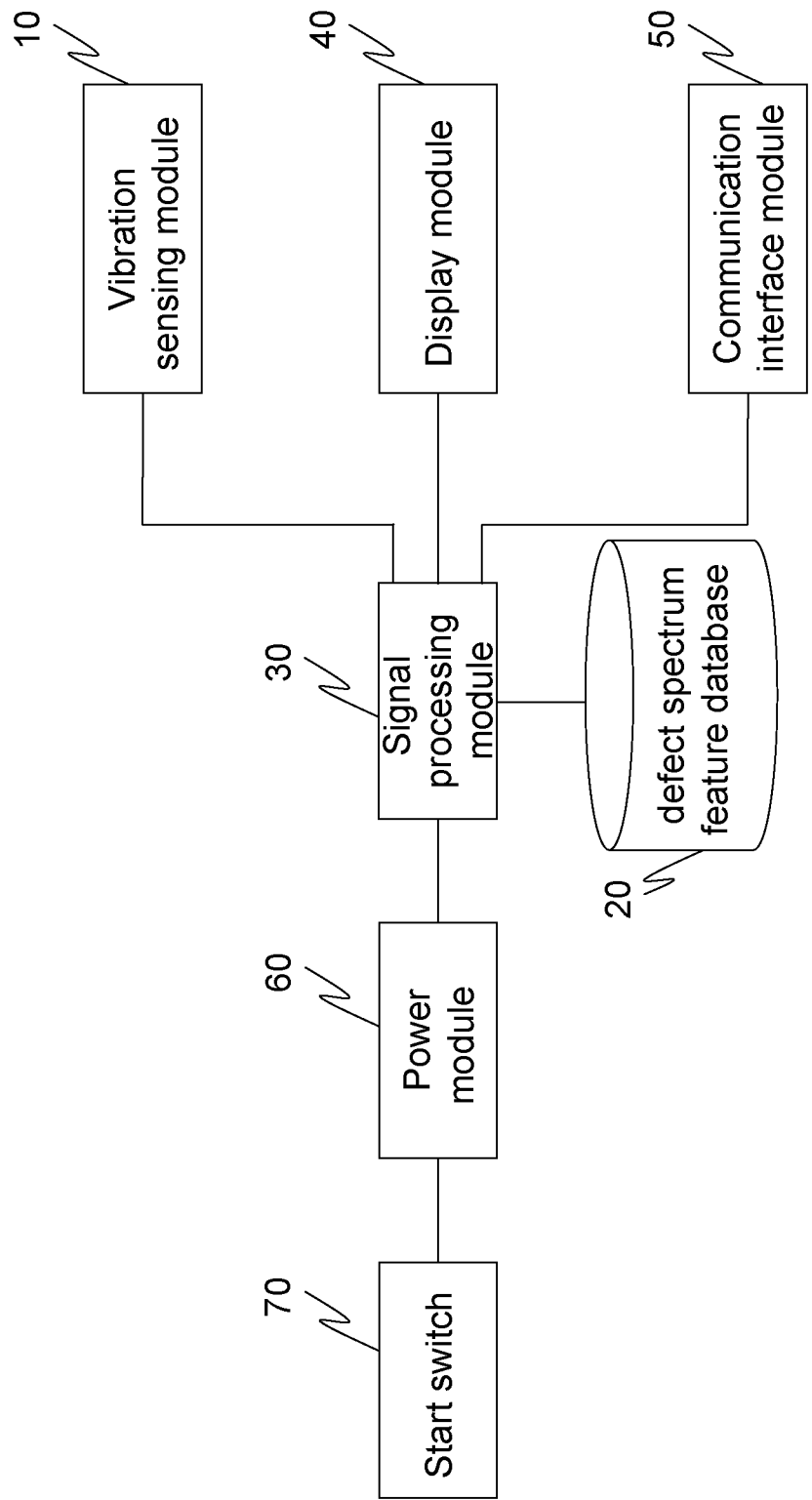
FIG. 4 is a block diagram of a diagnosis device according to the first embodiment of the present invention.

FIG. 4 is a block diagram of a diagnosis device according to the first embodiment of the present invention. Referring to FIG. 4, the diagnosis device of defects in a motor according to the present invention includes a vibration sensing module 10, a defect spectrum feature database 20, a signal processing module 30, a display module 40, a communication interface module 50, a power source module 60, and a start switch 70.

The vibration sensing module 10 is used to generating a vibration signal corresponding to a vibration of a motor during operation of the motor. The vibration sensing module 10 can measure an amount of the vibration of the motor in a non-destructive manner. The vibration sensing module 10 may be, for example, an accelerometer.

The defect spectrum feature database 20 can store a plurality of data of the defects to the spectrum features. The data of the defects to the spectrum features include spectrum feature(s) of each defect type. The defect types of the motor can include unbalance of a rotor, rotor misalignment of the rotor, looseness of the rotor, shaft bending of the rotor and combination of two of the unbalance, the misalignment, the looseness and the shaft bending.

The signal processing module 30 is connected to the vibration sensing module 10 and the defect spectrum feature database 20. The signal processing module 30 can receive the vibration signal, and then perform an analyzing procedure, a retrieving procedure and a comparison procedure according to a spectrum of the vibration signal. In the analyzing procedure, the signal processing module 30 can analyze the spectrum of the vibration signal to recognize a position of a fundamental frequency in the spectrum of the vibration signal, so as to retrieve a first harmonic of a plurality of spectrum features in the spectrum of the vibration signal. That is, the fundamental frequency is the first harmonic. Then, in the retrieving procedure, the signal processing module 30 can retrieve at least one of the other of the spectrum features from the spectrum of the vibration signal according to the position of the fundamental frequency, i.e. the first harmonic. In the comparison procedure, the signal processing module 30 can look up the defect spectrum feature database 20 according to the retrieved spectrum features to determine a defect type of the motor. That is, the signal processing module 30 compares the retrieved spectrum features and the data in the defect spectrum feature database 20, to identify the defect type of the motor based on the retrieved spectrum features.

The display module 40 is connected to the signal processing module 30. The display module 40 is used to display data output from the signal processing module 30. The display module 40 may be, for example, a liquid crystal display (LCD).

The communication interface module 50 is connected to the signal processing module 30. The communication interface module 50 transmits the data output from the signal processing module 30 or transmits data to the signal processing module 30. The communication interface module 50 may be, for example, a Bluetooth wireless communication module, a universal serial bus (USB) module, and/or a serial transmission interface module.

The power module 60 is connected to the signal processing module 30. The power module 60 supplies power to the vibration sensing module 10, the defect spectrum feature database 20, the signal processing module 30, the display module 40, and the communication interface module 50. The power source module 60 may be, for example, a battery set.

The start switch 70 is connected to the power module 60, and used to turn on or turn off the power module 60.

Figure 5:
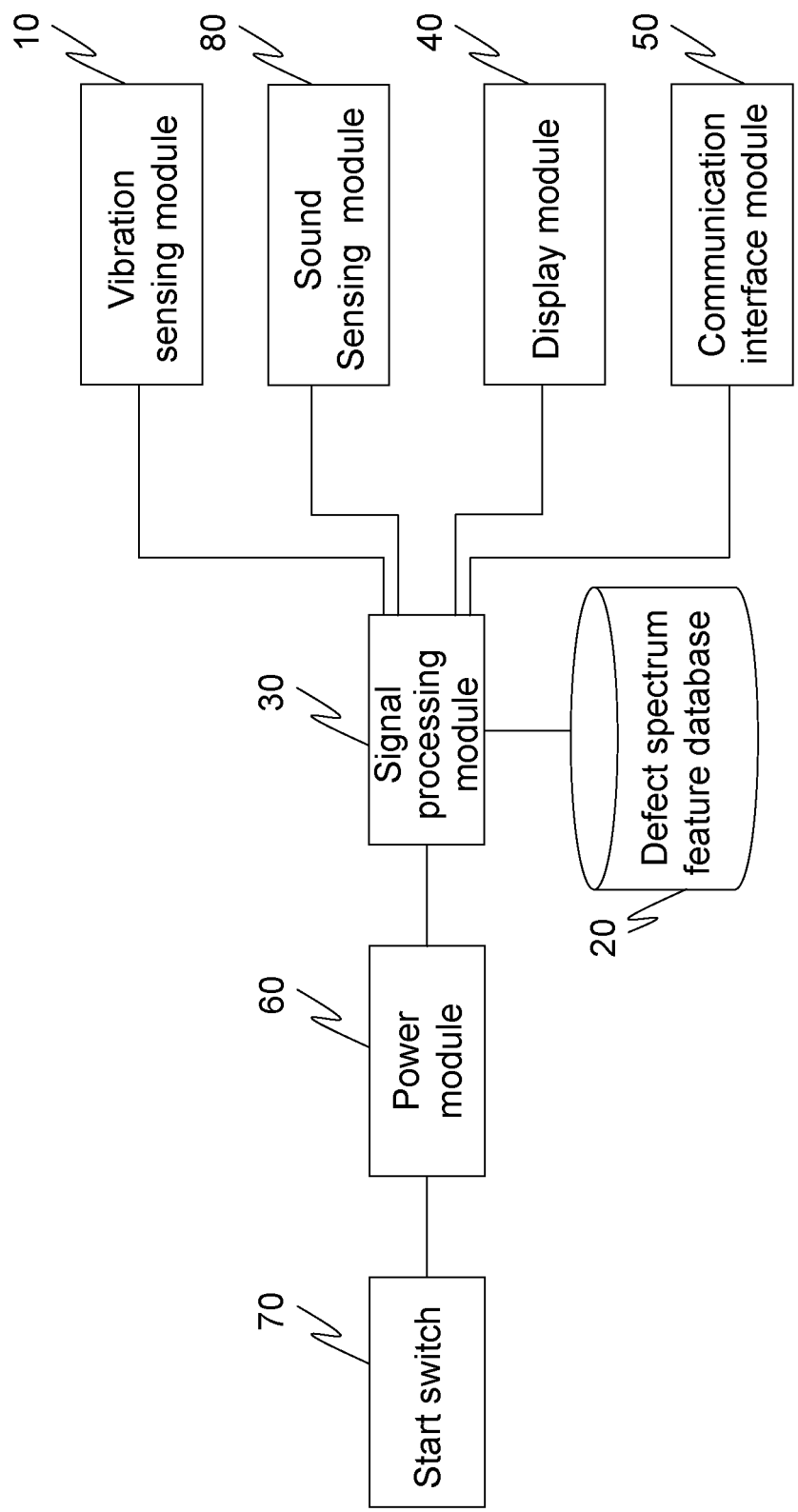
FIG. 5 is a block diagram of the diagnosis device according to the second embodiment of the present invention.

FIG. 5 is a block diagram of the diagnosis device according to the second embodiment of the present invention. Referring to FIG. 5, in this embodiment, the diagnosis device of defects in a motor can be used to diagnose a defect type of a bearing. The diagnosis device can include a vibration sensing module 10, a defect spectrum feature database 20, a signal processing module 30, a display module 40, a communication interface module 50, a power module 60, a start switch 70, and a sound sensing module 80.

The vibration sensing module 10 can measure an amount of the vibration of the motor in a non-destructive manner to generate a vibration signal corresponding to a vibration of a motor during operation of the motor. The vibration sensing module 10 may be, for example, an accelerometer.

The sound sensing module 80 senses a sound signal generated when the motor operates and can measure a volume of a sound of the operation of the motor in the non-destructive manner to generate a sound signal corresponding to the sound of the operation of the motor during the operation of the motor. The sound sensing module 80 may be, for example, a microphone.

The defect spectrum feature database 20 stores a plurality of data of the defects to the spectrum features. The data of the defects to the spectrum features include spectrum feature(s) of each defect type. The defect types of the motor can include unbalance of a rotor, misalignment of the rotor, looseness of the rotor, shaft bending of the rotor, bearing of a ball, and combination of at least two of the unbalance, the misalignment, the looseness, the shaft bending and the bearing.

The signal processing module 30 is connected to the vibration sensing module 10 and the defect spectrum feature database 20. The signal processing module 30 can receive the vibration signal, and then perform an analyzing procedure, a retrieving procedure and a comparison procedure according to a spectrum of the vibration signal. In the analyzing procedure, the signal processing module 30 analyzes the spectrum of the vibration signal to recognize a position of a fundamental frequency in the spectrum of the vibration signal to retrieve a first harmonic of a plurality of spectrum features in the spectrum of the vibration signal, and determine the position of the fundamental frequency once again according to a spectrum of the sound signal. The signal processing module 30 can set common features between the spectrum of the vibration signal and the spectrum of the sound signal as composite features. The signal processing module 30 can retrieve a position of a harmonic frequency of the maximum composite feature in the spectrum of the vibration signal. The signal processing module 30 can retrieve data of other spectrum feature(s) from the spectrum of the vibration signal according to the position of the fundamental frequency and the harmonic frequency. This is, the signal processing module 30 can retrieve at least one of the other spectrum features in the spectrum of the vibration signal according to the first harmonic and the position of the harmonic frequency. In the comparison procedure, the signal processing module 30 can look up the defect spectrum feature database according to the data of the retrieved spectrum features to determine a defect type of the motor.

The display module 40 is connected to the signal processing module 30. The display module 40 is used to display data output from the signal processing module 30. The display module 40 may be, for example, an LCD.

The communication interface module 50 is connected to the signal processing module 30. The communication interface module 50 can transmit the data output from the signal processing module 30 or transmit a data to the signal processing module 30. The communication interface module 50 may be, for example, a Bluetooth wireless communication module, a USB module, and/or a serial transmission interface module.

The power module 60 is connected to the signal processing module 30. The power module 60 can supply power to the vibration sensing module 10, the defect frequency spectrum feature database 20, the signal processing module 30, the display module 40, and the communication interface module 50. The power module 60 may be, for example, a battery set.

The start switch 70 is connected to the power module 60 and used to turn on or turn off the power module 60.

To sum up, through the diagnosis method of the defects in the motor equipment and the diagnosis device thereof according to the present invention, the diagnosis can be implemented merely with vibration sensing information and the sound sensing information without other motor parameters. Furthermore, through the diagnosis method of defects in a motor and the diagnosis device thereof according to the present invention, even the vibration sensing information retrieved by the vibration sensing module, such as an accelerometer, can be used as only diagnosis data. Besides, the diagnosis method of defects in a motor and the diagnosis device thereof according to the present invention can be implemented by an embedded system with an advanced RISC machine (ARM) architecture, and the embedded system with an advanced RISC machine (ARM) architecture is used together to perform classification algorithm and comparison, so as to determine the defect type of the motor. Especially, when performing a routing inspection, the plant working personnel can primarily diagnose each motor immediately through such system. Once an abnormal circumstance is primarily diagnosed, the consultant firms perform a detailed estimation on the performance of the motor by using professional tools and techniques. Thus, according to the present invention, the diagnosis method of the defects in the motor equipment and the diagnosis device thereof have advantages of a high diagnosis speed, a low cost, and being easily operated.

What is claimed is:

1. A diagnosis method of defects in a motor, comprising:
    generating a vibration signal corresponding to a vibration of a motor by a vibration sensing module during operation of the motor;
    generating a sound signal corresponding to a sound of the operation of the motor by a sound sensing module during the operation of the motor;
    performing a data pre-processing procedure to pre-process the vibration signal, so as to eliminate noises of the vibration signal;
    performing an analyzing procedure by a processor to analyze a spectrum of the vibration signal pre-processed after the data pre-processing procedure, so as to retrieve a fundamental frequency in the spectrum of the vibration signal, wherein the spectrum of the vibration signal includes a speed spectrum and an acceleration spectrum, and the analyzing procedure comprising:
        obtaining a maximum value in the speed spectrum and a maximum value in the acceleration spectrum;
        dividing all spectrum values in the speed spectrum by the maximum value in the speed spectrum, and dividing all spectrum values in the acceleration spectrum by the maximum value in the acceleration spectrum; and
        retrieving the fundamental frequency which has a maximum normalized value in the speed spectrum or at the same position in both of the acceleration spectrum and the speed spectrum;
    retrieving spectrum features in the spectrum of the vibration signal according to the fundamental frequency; and
    performing a comparison procedure with a defect spectrum feature database according to the retrieved spectrum features, so as to determine a defect type of the motor.

2. The diagnosis method according to claim 1, wherein the step of performing the data pre-processing procedure further comprises pre-processing the sound signal to eliminate noises of the sound signal.

3. The diagnosis method according to claim 2, wherein the step of performing the analyzing procedure further comprises determining the fundamental frequency according to a spectrum of the sound signal after the data pre-processing procedure.

4. The diagnosis method according to claim 3, wherein after the step of determining the fundamental frequency, the method further comprises:
    setting common features between the spectrum of the vibration signal and the spectrum of the sound signal as composite features; and
    retrieving a position of a harmonic frequency of a maximum composite feature of the composite features in the spectrum of the vibration signal.

5. The diagnosis method according to claim 4, wherein the step of retrieving the at least one of the other of the spectrum features comprises retrieving the at least one of the other of the spectrum features from the spectrum of the vibration signal according to the fundamental frequency and the position of the harmonic frequency.

6. The diagnosis method according to claim 1, wherein the step of performing the data pre-processing procedure comprises performing an integral procedure to integrate the vibration signal.

7. The diagnosis method according to claim 1, wherein the defect type comprises one of unbalance, misalignment, looseness, shaft bending, bearing and combination thereof.

8. A diagnosis device of defects in a motor equipment, comprising:
    a vibration sensing module, for generating a vibration signal corresponding to a vibration of a motor during operation of the motor;
    a defect spectrum feature database, for storing a plurality of data of detects to spectrum features;
    a signal processing module, for receiving the vibration signal, performing an analyzing procedure to analyze a spectrum of the vibration signal to determine retrieve a fundamental frequency in the spectrum of the vibration signal, retrieving at least one of the other of the spectrum features from the spectrum of the vibration signal according to the fundamental frequency, and looking up the defect spectrum feature database according to the retrieved spectrum features to determine a defect type of the motor, wherein the spectrum of the vibration signal includes a speed spectrum and an acceleration spectrum, and the analyzing procedure comprising:
        obtaining a maximum value in the speed spectrum and a maximum value in the acceleration spectrum;
        dividing all spectrum values in the speed spectrum by the maximum value in the speed spectrum, and dividing all spectrum values in the acceleration spectrum by the maximum value in the acceleration spectrum; and retrieving the fundamental frequency which has a maximum normalized value in the speed spectrum at the same position in both of the acceleration spectrum and the speed spectrum;

a display module, for displaying data output from the signal processing module; and a communication interface module, for transmitting the data output from the signal processing module and transmitting data to the signal processing module.

9. The diagnosis device according to claim 8, further comprising:

a power module, for supplying power to the vibration sensing module, the defect spectrum feature database, the signal processing module, the display module, and the communication interface module; and a start switch, for turning on or turning off the power module.

10. The diagnosis device according to claim 8, further comprising: a sound sensing module, for generate a sound signal corresponding to a sound of the operation of the motor during the operation of the motor.

11. The diagnosis device according to claim 10, wherein the signal processing module determines the fundamental frequency according to a spectrum of the sound signal, sets common features between the spectrum of the vibration signal and the spectrum of the sound signal as composite features, retrieves a position of a harmonic frequency of a maximum composite feature of the composite features in the spectrum of the vibration signal, and retrieves spectrum features from the spectrum of the vibration signal according to the retrieved fundamental frequency and the position of the harmonic frequency.

12. The diagnosis device according to claim 11, wherein the defect type comprises one of unbalance, misalignment, looseness, shaft bending, bearing and combination thereof.

13. The diagnosis device according to claim 8, wherein the vibration sensing module is an accelerometer.

14. The diagnosis device according to claim 8, wherein the sound sensing module is a microphone.

15. The diagnosis device according to claim 8, wherein the display module is a liquid crystal display (LCD).

* * * * *